United States Patent [19]

Kobayashi

[11] Patent Number: 4,811,472

[45] Date of Patent: Mar. 14, 1989

[54] METHOD OF MAKING A STEERING WHEEL

[75] Inventor: Teruo Kobayashi, Aichi, Japan

[73] Assignee: Toyoda Gosei Co., Ltd., Nishikasugai, Japan

[21] Appl. No.: 17,007

[22] Filed: Feb. 18, 1987

Related U.S. Application Data

[62] Division of Ser. No. 856,156, Apr. 25, 1986, abandoned.

[30] Foreign Application Priority Data

Apr. 26, 1985 [JP] Japan ................................ 60-92093

[51] Int. Cl.$^4$ .................................................. B21D 53/26
[52] U.S. Cl. .................................. 29/159 B; 264/275; 264/276; 264/328.12; 425/812
[58] Field of Search .................... 29/159 B; 74/552; 264/275, 276, 328.9, 328.12; 425/116, 812

[56] References Cited

U.S. PATENT DOCUMENTS

| | | | |
|---|---|---|---|
| 1,375,670 | 4/1921 | Bundy | 29/159 B |
| 1,779,219 | 10/1930 | Sheller | 29/159 B |
| 1,784,733 | 12/1930 | Kraft | 74/552 |
| 1,811,269 | 6/1931 | Hanson et al. | 74/552 |
| 1,853,583 | 4/1932 | Smith | 29/159 B |
| 1,869,334 | 7/1932 | Bronson et al. | 74/552 |
| 2,179,013 | 11/1939 | Kaye | 74/552 |
| 2,459,271 | 1/1949 | Fantz | 74/552 |
| 2,810,301 | 10/1957 | Mathues | 74/552 |
| 3,523,464 | 8/1970 | Quillery et al. | 74/552 |
| 4,011,644 | 3/1977 | Muller et al. | 29/159 B |
| 4,061,054 | 12/1977 | Wenninger | 74/552 |
| 4,091,069 | 5/1978 | Allen | 425/812 |

FOREIGN PATENT DOCUMENTS

| | | | |
|---|---|---|---|
| 1087022 | 8/1960 | Fed. Rep. of Germany | 74/552 |
| 1145499 | 3/1963 | Fed. Rep. of Germany | 74/552 |
| 1176009 | 8/1964 | Fed. Rep. of Germany | 74/552 |
| 3236257 | 4/1984 | Fed. Rep. of Germany | 74/552 |
| 178970 | 11/1982 | Japan | 74/552 |
| 59-100055 | 6/1984 | Japan | 74/552 |
| 32843 | 2/1985 | Japan | 74/552 |
| 5383 | 5/1921 | Netherlands | 29/159 B |
| 262340 | 12/1926 | United Kingdom | 74/552 |
| 1571902 | 7/1980 | United Kingdom | 74/552 |

Primary Examiner—P. W. Echols
Attorney, Agent, or Firm—Cushman, Darby & Cushman

[57] ABSTRACT

A method for making a steering wheel including a ring portion comprising a ring portion metal care having a plurality of angular portions in the transverse cross-section thereof. The ring portion metal core is provided in such a way that one of the diagonal lines which connect its angular portions is substantially parallel to the surface of a ring which is defined by connecting the entire periphery of the front edge of a ring portion in the diametral direction. A covering layer is covered on the surface of the ring portion metal core, and at least one spoke portion metal core is provided for mounting said ring portion on the steering shaft. The mold for molding the plastic covering on the ring core parts along a plane which includes the above-mentioned on diagonal line.

11 Claims, 4 Drawing Sheets

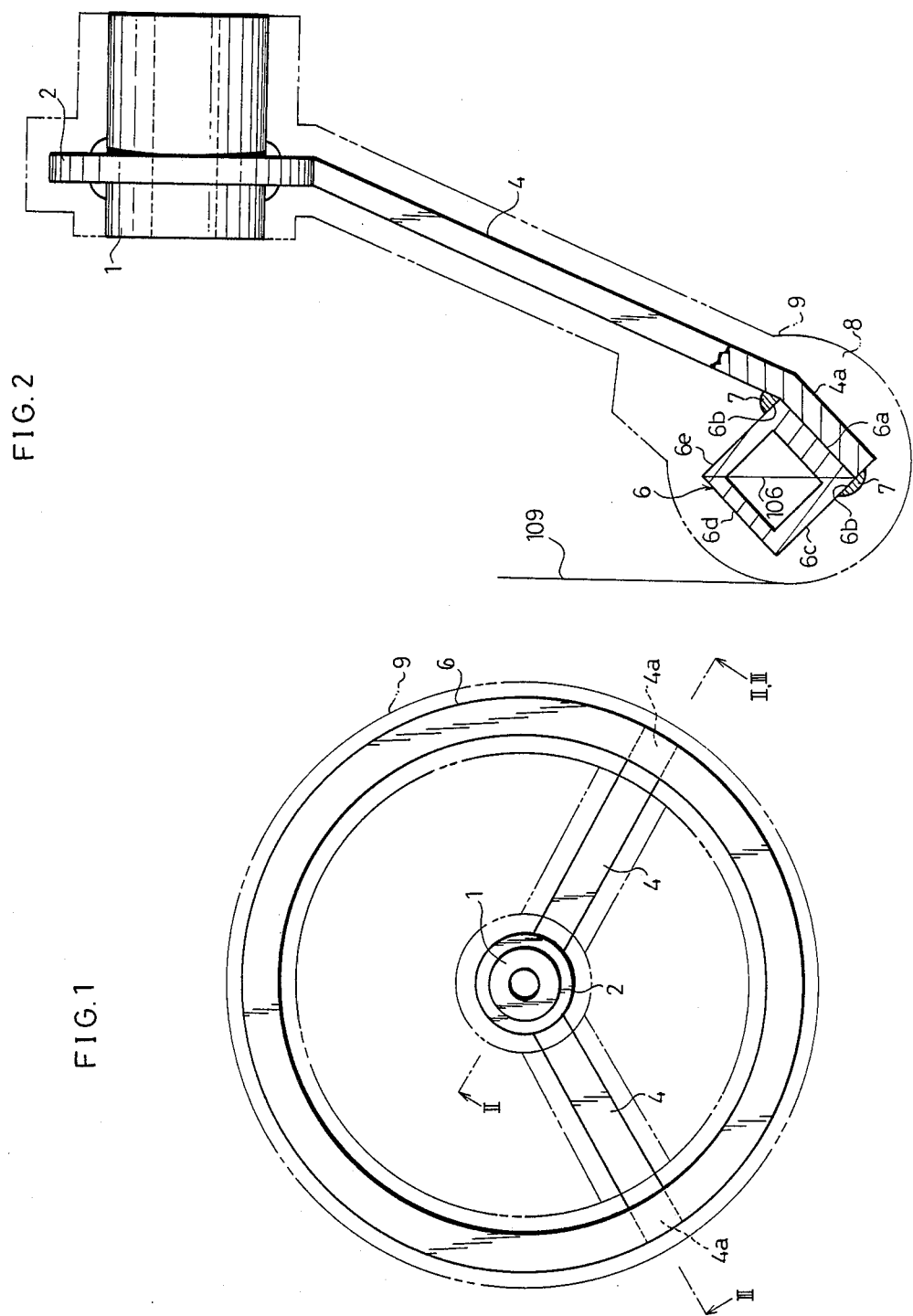

METHOD OF MAKING A STEERING WHEEL

This is a division of application Ser. No. 856,156, filed Apr. 25, 1986, which was abandoned upon the filing hereof.

BACKGROUND OF THE INVENTION

1. Field of the Invention

This invention relates to a method for making a steering wheel for use in a vehicle such as an automobile.

2. Description of the Related Arts

In general, the steering wheel comprises a metal core at the ring portion, a metal core at the spoke portion which is joined to the metal core of the ring portion, a boss, which is joined to the metal core of the spoke portion and which is fitted to the steering shaft and a coated layer made of polypropylene, polyvinyl chloride, urethane or the like which is coated along the outer periphery thereof by injection molding, RIM molding, casting or the like.

Among these metal cores for the steering wheel, the metal core at the ring portion is, in many cases, of a circular shape in transverse cross-section, which is likely to cause the offset caused by sliding which occurs at the boundary between the metal and the above coating layer during the use of the above steering wheel, with the result of which the corresponding portion can be peeled off. Consequently, in recent years, it has been suggested that the cross section of this core metal at the ring portion should be defined in a non-circular form, for example, in a rectangular or pentagonal form for the purpose of preventing the above-mentioned sliding.

In case the coating layer made of the synthetic resin is defined by injection molding along the outer periphery of the metal core at the ring portion, the metal core is placed in the mold as shown in FIG. 6. Namely, in the molding groove portions 41a and 42a of a pair of molds for injection molding, the metal core at the ring portion 45 is placed in such a way that a portion wherein the gap is increased between the molding grooves 41a and 42a and the metal core 45 is opposed to a surface along which the mold is to be opened.

However, in case the ring portion metal core 45 is disposed in this way to form the coating layer 44, the synthetic resin can flow with predominance during the injection molding into the wider space at the cavity between the above molding grooves 41a and 42a and the metal core. Consequently, the air within the cavity is collected into the coating layer 44 portion which coats an angular portion 45a of the above ring metal core 45, a portion where the resin flows most slowly to reside there to cause a bad appearance due to air hardening or a weld line at this portion of the article.

SUMMARY OF THE INVENTION

An object of the invention is to provide a steering wheel with an excellent ring portion which is free from a bad appearance. To achieve the above-mentioned object, the invention comprises a method for making a steering wheel in which the ring portion metal core has a plurality of angular portions, as viewed in transverse cross-section, wherein one of diagonal lines connecting the angular portions is defined such that it extends substantially parallel to the imaginary ring plane surface which is defined by connecting all opposite sites on the entire periphery of the ring portion in the diametral direction. The ring portion comprises a coating layer which is coated onto the surface of the ring portion metal core. The steering wheel further includes at least one spoke portion metal core for mounting the above ring portion onto the steering shaft.

Further objects of the invention will be obvious when the embodiments to be described hereinbelow and the claims are understood and a great many of advantages which are not referred to herein will occur to persons skilled in the art.

BRIEF DESCRIPTION OF THE DRAWINGS

FIG. 1 shows an elevational view illustrating a steering wheel which embodies the present invention.

FIG. 2 shows a cross-sectional view, taken along the line II—II of FIG. 1,

DETAILED DESCRIPTION OF THE PREFERRED EMBODIMENTS

Figure 3:
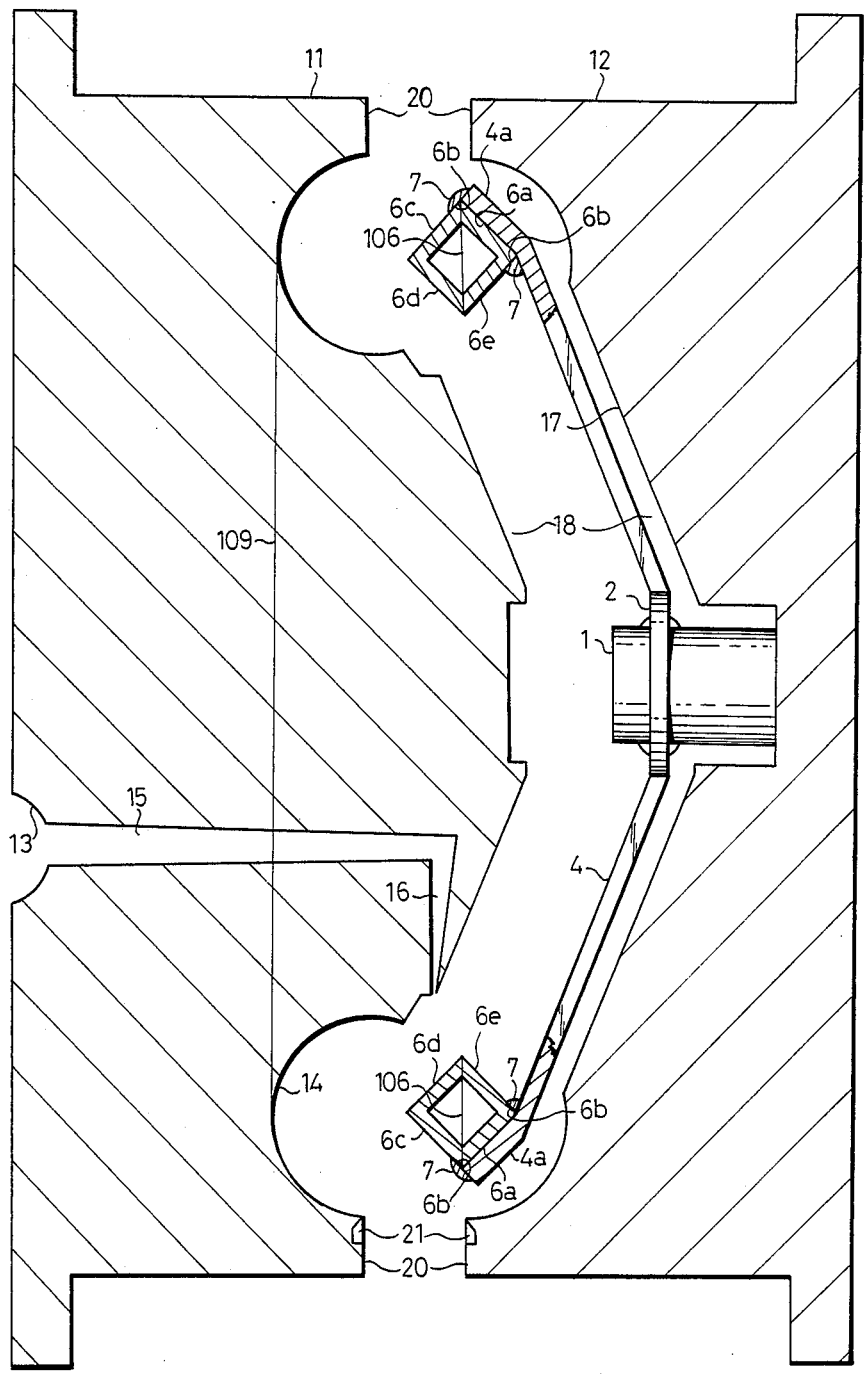
FIG. 3 shows a cross-sectional view, taken along the line III—III of FIG. 1, illustrating the state wherein the metal core is placed into the injection mold for forming the covering layer onto the steering wheel metal core according to the present invention.

The invention is described hereinafter in accordance with one embodiment, embodied in the steering wheel, referring to FIGS. 1 and 2.

A circular boss plate 2 is fixed by welding along the outer periphery of the tubular boss 1 which is to be fitted to the steering shaft. At the edge portions of the boss plate 2 two spoke portion metal cores 4 are integrally defined and at each end portion thereof a mounting portion 4a is bent from the plane of the adjoining portion of the respective spoke core. As shown in FIG. 2, at both of the above mounting portions 4a the annular-shaped hollow-ring portion metal core 6 is fixedly welded. The above ring portion metal core 6, the outer side of the cross section of which is defined in the form of the regular tetragon, has a rear surface portion 6a at the outer side thereof, a front surface portion 6c at the outer side thereof, a front surface portion 6d at the inner side thereof and a rear surface portion 6e at the inner side thereof the surface 6a being opposed to the surface 6d and the surface 6c being opposed to the surface 6e. The rear surface portion 6a at the outer side abuts the mounting portion 4a and is fixedly welded at both of the inner and outer edge portions 6b. Consequently, a bead 7 caused by welding sticks to these portions 6b.

In this ring portion metal core 6, the rear surface portion 6a at the outer side is defined thicker than the other surfaces along the entire periphery. According to the present embodiment, the rear surface portion 6a at the outer side is defined so as to have a thickness of 1.5 mm, while other portions are defined so as to have a thickness of 1.2 mm. During the drawing process of the above ring portion metal core 6, the rear surface portion 6a at the outer side is defined so as to be thicker and, subsequently, is defined in the annular form by a bending process.

Along the outer periphery of the steering wheel metal core thus constructed, a covering layer 8 made of PP, PVC or the like is formed by injection molding to form the ring portion 9 the cross section of which is circular. The ring portion metal core 6 is placed such that one 106 of two diagonal lines which connect angular portions in its cross section i.e. the lines connecting an angle defined between the rear surface 6a at the radially outer side and the front surface portion 6c at the outer side with an angle defined between the front surface portion 6d at the inner side and the front surface portion 6e at the inner side is substantially parallel to the surface of the ring 109. By the surface of the ring 109 is meant a surface which will be defined by connecting the entire periphery of the front edge of the ring portion 9 in the diametral direction.

Figure 4:
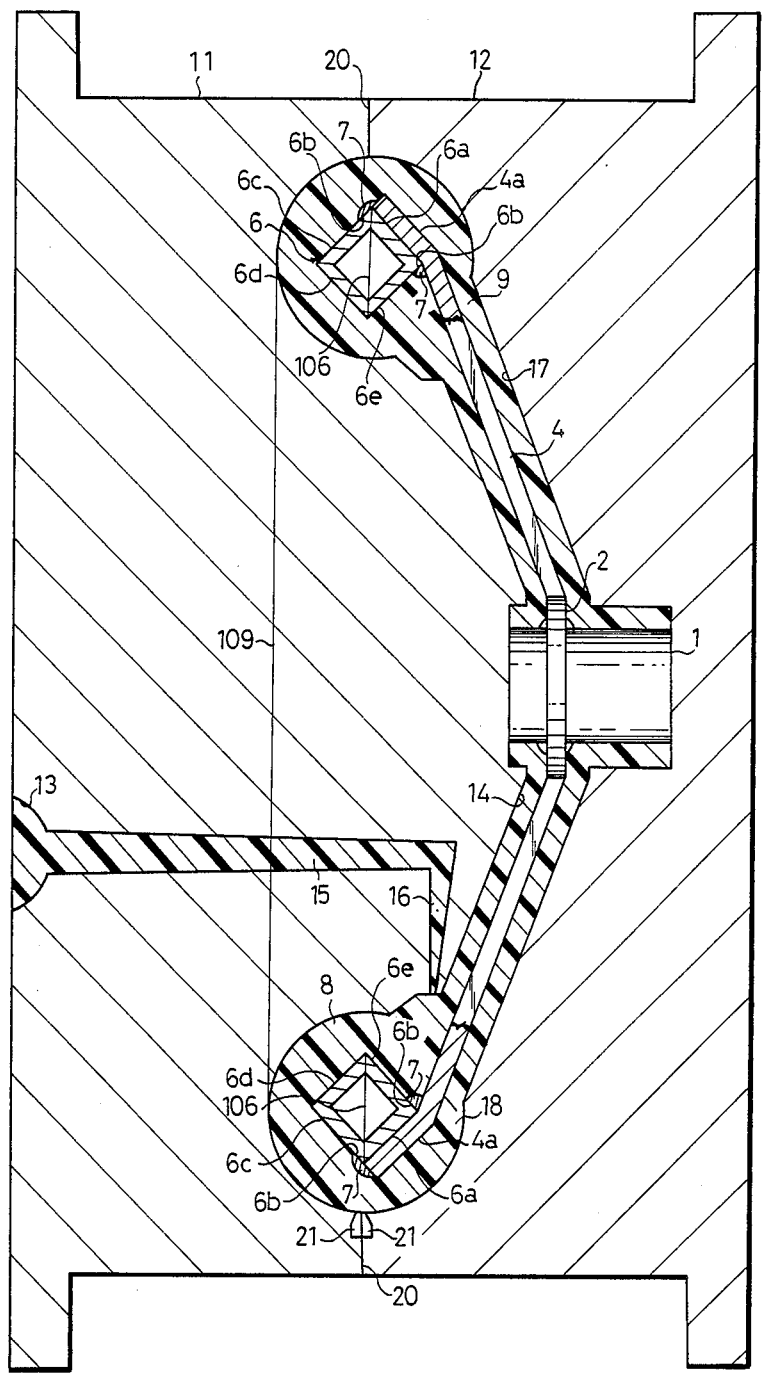
FIG. 4 shows a cross-sectional view, illustrating the state wherein the resin is filled within the injection molding mold depicted in FIG. 3.
Figure 6:
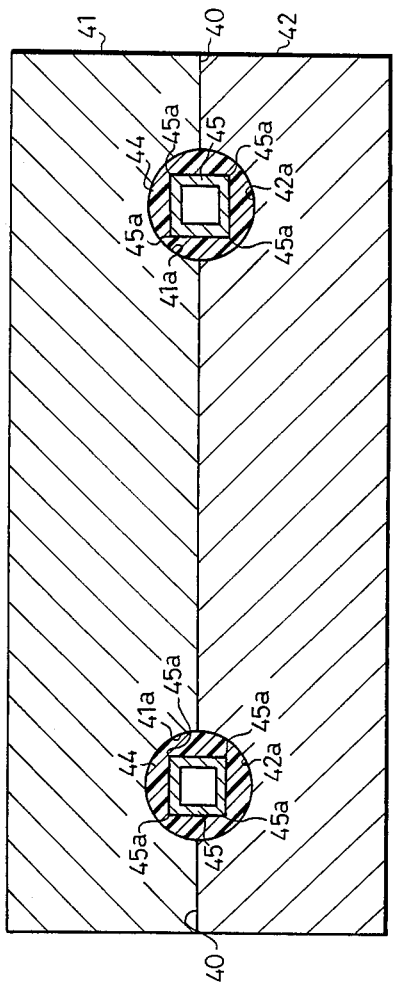
FIG. 6 shows a cross sectional view, illustrating the prior art.

In the steering wheel thus constructed, the method wherein PVC resin is covered onto the core metal of the steering wheel by injection molding is described, referring to FIGS. 3 and 4. First, an injection molding device is described which is used for this molding.

This device comprises a fixed mold member 11 and a movable mold member 12 which are divided left and right along the mold opening surface (i.e. parting line plane) 20 and at the side surface of the fixed mold member 11 an abutment portion of the nozzle 13. Besides, a molding groove 14 for molding the covering layer is defined on the mold opening surface 20 of the fixed mold member 11, while a sprue 15 which is in communication with the above abutment portion of the nozzle 13 is defined such that it communicates via a runner 16 and a gate with the molding groove 14. A molding groove 17 which is combined with the molding groove 14 is defined on the mold open surface 20 of the movable mold member 12, such that a cavity 18 is defined during clamping the mold members between the groove 17 and the groove 14. Furthermore, on the mold open surface 20 of above both grooves 14 and 17, three bend portions 21 (of which only one is shown) which serve to vent the air during the operation are defined at predetermined intervals. The ring portion 9 is formed as follows by using this mold for injection molding.

As shown in FIG. 3, the steering wheel metal core is inserted into the molding groove 17 of the above movable mold member 12 in such a way that the diagonal line 106 of the ring portion metal core 6 may become parallel to the surface of the ring 109. In other words, the mold open surface 20 (In Figs the mold open surface is referred to as the surface located at the outer side of the molding groove of both molds.) may be placed on the extension line of the above diagonal line 106. Then the two mold members are clamped together and the injection molding nozzle (not shown) is made to abut the above abutment portion of nozzle 13 to inject molten PVC resin into the mold cavity, about the metal core of the steering wheel. At this time, as shown in FIG. 4, the molten PVC resin is filled via the sprue 15 and the runner 16 into the cavity 18. Since, at this time, the PVC resin is filled into the cavity sequentially from the portion close to the runner 16, the PVC resin is ultimately filled to the mold open surface 20. Consequently, the air within the cavity is driven by the PVC resin to be collected to the mold open surface. Since the mold open surface 20 has the bend portion 21 for absorbing the air, the air to remain trapped in the mold cavity is absorbed into the bend portion 21, causing no residual air. When, after the PVC was hardened, molds are opened to take out the molded article, a steering wheel can be obtained having a ring portion 9 which does not have a distinct air burning or weld line.

As described above, according to the present invention, since one 106 of diagonal lines which connect angular portions of the cross section of the ring portion metal core 6 is made substantially parallel to the mold open surface 20 and the steering wheel metal core 6 is located in such a way that the mold open surface 20 is positioned on the extension line of the above diagonal line 106, during the molding of the ring portion 9 the resin 8 which serves as the covering layer 8 ultimately flows toward the mold cavity open surface 20, while the air within the molds is absorbed at the bend portion 21. Consequently, on the covering layer 8, air burning or a weld line is not caused by the residual gas and a steering wheel having a ring portion 9 with an excellent appearance can be obtained. In the above ring portion metal core 6, the rear end surface 6a at the outer side which is joined to the spoke portion metal core 4 is made thicker along the entire periphery, the ring portion metal core 6 can be prevented from melting away due to the welding heat. Furthermore, since the exterior form of the ring portion metal core 6 is made to be tetragonal in cross-section and the rear end portion 6a at the outer side thereof and the mounting portion 4a are welded in an overlapping way, their contact area at the welded portion can be increased to thereby securely weld them.

The invention is not confined to the above-mentioned embodiment and the following embodiments can be conceived.

Figure 5:
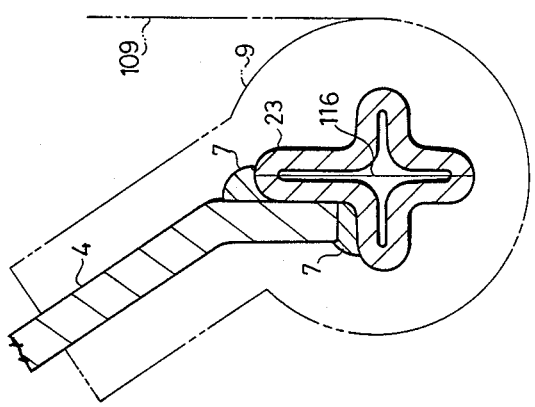
FIG. 5 shows a cross-sectional view, illustrating another embodiment according to the present invention.

(1) The ring portion metal core 6 is not restricted to on of the thin and hollow form, as constructed in the preferred embodiment of the present invention, but may be of solid form. Furthermore, the shape thereof may be rhombic or cross-shaped in cross-section, as shown in FIG. 5, such that the one 116 of the diagonal lines which connect opposed angular portions thereof may be parallel to the surface of the ring.

(2) The number of the spoke portion metal cores 4 is not confined to two as in the preferred embodiment of the present invention, but any number may be provided such as three or four or one.

(3) The steering wheel metal core according to the present invention is not confined to one for use in an automobile, but may be embodied in rolling stocks for industrial use such as a shovel car, truck, tractor or the like.

Since evidently modifications can be evidently made without departing from the spirit and the scope of the invention, this invention is not confined to a particular form except as specified in the following claims.

What is claimed is:

1. A method for making a steering wheel, comprising:
  (a) providing a steering wheel metal core which includes a ring portion, a boss portion for fitting the steering wheel to a steering shaft, and at least one spoke portion having one end joined to the ring portion and an opposite end joined to the boss portion; the ring portion, in transverse cross-section being a geometric figure having four apices comprising two pairs of circumferentially non-adjacent apices, one of these pairs including a first apex which extends generally radially inwardly with reference to the center of the ring portion and a second apex which extends generally radially outwardly with reference to said center;
  (b) providing an openable-closable mold including two complementary mold parts which, when the mold is closed, define a mold cavity for a steering wheel and, when the mold is opened, part from one another along a parting line plane;

(c) disposing at least said ring portion of said steering wheel metal core in said mold and closing said mold with said ring portion so arranged in said mold cavity that an imaginary plane passing generally radially through said ring portion so as to contain said first and second apices, is substantially aligned with said parting line plane of said mold;

(d) while said ring portion of said steering wheel metal core is so disposed, molding a layer of synthetic resin about said ring portion of said steering wheel metal core by filling said mold cavity about said ring portion with a molding composition of such synthetic resin; and (e) opening said mold along said parting line plane and removing the resulting steering wheel from said mold.

2. The method of claim 1, wherein:
said ring portion of said steering wheel metal core is hollow.

3. The method of claim 1, wherein:
said ring portion of said steering wheel metal core is externally tetragonal in transverse cross-sectional shape.

4. The method of claim 1, wherein:
said ring portion of said steering wheel metal core is of four-lobed cruciform external shape in transverse cross-section.

5. The method of claim 1, wherein:
the step of providing said steering wheel metal core comprises overlapping said ring portion with said one end of each said at least one spoke portion and, while maintaining such an overlapped condition, welding said ring portion to each said one end.

6. The method of claim 5, wherein:
said ring portion of said steering wheel metal core is hollow and of non-uniform wall thickness, being thicker where overlapped with and welded to each said one end, than elsewhere circumferentially aout the transverse cross-section thereof.

7. The method of claim 6, wherein:
said mold, in steps (c) and (d) also encloses each said spoke portion in said mold cavity, and in step (d) said layer of synthetic resin is also molded about each said spoke portion.

8. The method of claim 7, wherein:
each said spoke portion as provided in step (a) is bent at a respective site thereon adjoining said one end thereof so that said one end is inclined at a different angle with reference to the longitudinal axis of said steering wheel than is the adjoining remainder of each said spoke portion radially inwardly of said steering wheel from said one end of such spoke portion.

9. The method of claim 8, wherein:
said ring portion of said steering wheel metal core is externally tetragonal in transverse cross-sectional shape and said angle at which said one end of each said spoke portion is inclined with reference to said axis is smaller than that at which the respective said adjoining remainder is inclined.

10. The method of claim 8, wherein:
said ring portion of said steering wheel metal core is of four-lobed cruciform external shape in transverse cross-section and said angle at which said one end of each said spoke portion is inclined with reference to said axis is larger than that at which the respective said adjoining remainder is inclined.

11. The method of claim 1, further including:
venting said mold cavity along said parting line plane while conducting step (d).

* * * * *